United States Patent [19]

Howkins

[11] Patent Number: 4,523,200

[45] Date of Patent: Jun. 11, 1985

[54] METHOD FOR OPERATING AN INK JET APPARATUS

[75] Inventor: Stuart D. Howkins, Ridgefield, Conn.

[73] Assignee: Exxon Research & Engineering Co., Florham Park, N.J.

[21] Appl. No.: 453,571

[22] Filed: Dec. 27, 1982

[51] Int. Cl.[3] .......... G01D 15/16

[52] U.S. Cl. .......... 346/1.1; 346/140 R

[58] Field of Search .......... 346/1.1, 140 R; 310/317

[56] References Cited

U.S. PATENT DOCUMENTS

| | | | |
|---|---|---|---|
| 3,979,756 | 9/1976 | Helinski et al. . | |
| 4,024,544 | 5/1977 | Vernon . | |
| 4,068,241 | 1/1978 | Yamada . | |
| 4,104,646 | 8/1978 | Fischbeck . | |
| 4,112,433 | 9/1978 | Vernon . | |
| 4,184,168 | 1/1980 | Isayama et al. . | |
| 4,266,232 | 5/1981 | Juliana, Jr. et al. . | |
| 4,312,007 | 1/1982 | Winfield . | |
| 4,393,384 | 7/1983 | Kyser | 346/1.1 X |
| 4,418,355 | 11/1983 | De Young et al. | 346/140 R |
| 4,424,520 | 1/1984 | Matsuda et al. | 346/140 R |
| 4,471,363 | 9/1984 | Hanaoka | 346/140 R |

*Primary Examiner*—E. A. Goldberg
*Assistant Examiner*—Gerald E. Preston
*Attorney, Agent, or Firm*—Kenneth Watov

[57] ABSTRACT

An improved method for operating an ink jet device comprises the steps of: First, operating the transducer of the device for initiating the ejection of an ink droplet from an orifice via a first pressure disturbance within the ink chamber associated with the orifice; and thereafter, prior to the ejection of an ink droplet from the orifice, operating the transducer for producing a second pressure disturbance, lower in amplitude than the first pressure disturbance, for increasing stability by causing earlier break-off of the droplet at the orifice relative to the time of break-off without using the second pressure disturbance.

6 Claims, 23 Drawing Figures

METHOD FOR OPERATING AN INK JET APPARATUS

The field of the present invention relates generally to ink jet apparatus, and more specifically to a method for operating an ink jet apparatus to substantially eliminate instabilities associated with the ejection of ink droplets.

The design of practical ink jet devices and apparatus for producing a single droplet of ink on demand is relatively new in the art. The present inventor has investigated the operation of drop on demand ink jet apparatus, and has uncovered a number of limitations. For example, he observed that when such an apparatus is operated for producing ink droplets having a relatively "low velocity", typically below 3.5 meters per second, placement of the ink droplets can be a problem. Irregularities in the physical configuration of the orifice, such as pitmarks, scratches, or contamination by foreign particles, can all contribute either individually or in some combination to causing "aiming errors", i.e. ejection of an ink droplet along a trajectory which does not coincide with the axis of symmetry through the orifice. Also, surface energy variations can cause aiming errors which result in errors in the placement of an ink droplet at a desired location on a recording medium. If an ink droplet is ejected from the edge of an orifice, for example, with low velocity operation an error in "placement" usually results, whereby the droplet strikes the recording media (usually paper) away from the intended "hit area" or recording location. For a given velocity, it has been observed that aim error tends to increase in direct relationship to the time that it takes for an ink droplet to break away from its ligament or the meniscus at the orifice, once the droplet has emerged from the orifice. The longer the ligament adheres to the droplet, the more likely that the droplet will be pulled away from the center of the orifice prior to its breaking away from the ligament and general region of the orifice, resulting in increased aim error. Aiming error can also be substantially reduced by increasing the droplet velocity because the physical and surface energy irregularities have a proportionally smaller effect on droplets traveling at a higher velocity. It has also been recognized in the prior art that the contribution to placement error due to velocity variations (Δv from channel to channel) could theoretically be reduced by increasing velocity, provided that Δv remains at the same value relative to lower velocity operation. To counter or reduce placement error problems at low velocity, the present inventor attempted to increase velocity of the ink droplets. However, attempts in the prior art to so increase the velocity resulted in air ingestion and spraying of the ink.

The present inventor recognized that by operating ink jet apparatus for producing ink droplets in a "high velocity" range of operation, typically from 3.0 meters per second to about 50 meters per second, placement error problems should be greatly reduced. He also recognized that the aiming error and velocity error Δv components of the placement error should be substantially reduced at velocities in the upper end of the high velocity range of operation. Also, he observed that reliability, droplet placement accuracy, and print quality is improved by operating an ink jet with relatively high viscosity inks (typically 14 cps) in the high velocity region. However, he encountered problems in operating ink jet apparatus for producing high velocity ink droplets. For example, when the high velocity ink droplets were obtained by merely increasing the drive voltage applied to the transducer of the ink jet apparatus, instabilities resulted which prevented reliable high velocity operation of the ink jet apparatus. These instabilities included the production of puddles of ink forming around the ink jet orifices after a period of time of operation of the ink jet. In extreme cases, the puddles could become large enough to cause ink to drip down the face of the ink jet apparatus. Also, another instability he observed was the production of spurious "satellite" droplets, which caused unwanted marks on the recording media or paper, resulting in degradation of the print quality. Because of the prior art problems, and the problems he observed, high velocity operation of ink jet apparatus is obviously very difficult to obtain, thereby limiting the practical velocity of the ink droplets to the low velocity range, typically between 2 and 3 meters per second, as previously mentioned.

The present invention provides a method for operating an ink jet apparatus for obtaining high velocity ink droplets while avoiding the problems previously mentioned. The method includes the steps of applying a first pulse to the transducer of the ink jet apparatus for initiating the ejection of an ink droplet from the orifice of the ink jet by creating a first pressure disturbance within the chamber of the ink jet apparatus; and thereafter, terminating the first pulse, and prior to the ejection of the ink droplet from the orifice, applying a second pulse to the transducer for producing a second pressure disturbance, for causing earlier break-off of the droplet from the orifice relative to the time of break-off occurrence when the second pulse is not employed. Note that the present invention is related to a similar method for improving aiming in the low velocity operation of an ink jet apparatus as shown in the copending application Ser. No. 453,293 filed Dec. 27, 1982, for "Method For Improving Low Velocity Aiming In Operating An Ink Jet Apparatus" (the invention thereof is assigned to the assignee of my present invention), and incorporated herein by reference. Also of interest is my copending application Ser. No. 384,131 (attorney Case No. IJ22), filed June 1, 1982, for "Method of Operating An Ink Jet".

In the drawing, wherein like items have common reference designations:

In FIG. 21 the velocity units are meters per second, and the frequency units are kilohertz.

In FIGS. 1 through 5, an ink jet apparatus of the present inventor's copending application Ser. No. 336,603, filed Jan. 4, 1982, for "Improved Ink Jet Method and Apparatus" is shown (the invention thereof is assigned to the assignee of the present invention), and incorporated herein by reference. The present invention was discovered during development of improved methods for operating an ink jet apparatus substantially as illustrated herein. However, the present inventor believes that the various embodiments of his invention illustrated and claimed herein are applicable for use with a broad range of ink jet apparatus (especially drop on demand ink jet apparatus). Accordingly, the ink jet apparatus to be discussed herein is presented for purposes of illustration of the method of the present invention, and is not meant to be limiting. Also, only the basic mechanical features and operation of this apparatus are discussed in the following paragraphs, and reference is made to the previously mentioned copending application for greater details concerning this apparatus. The reference designations used in FIGS. 1 through 5 are the same as used in the copending application, in order to facilitate any referencing back to that application or the patent that may issue therefrom.

Figure 1:
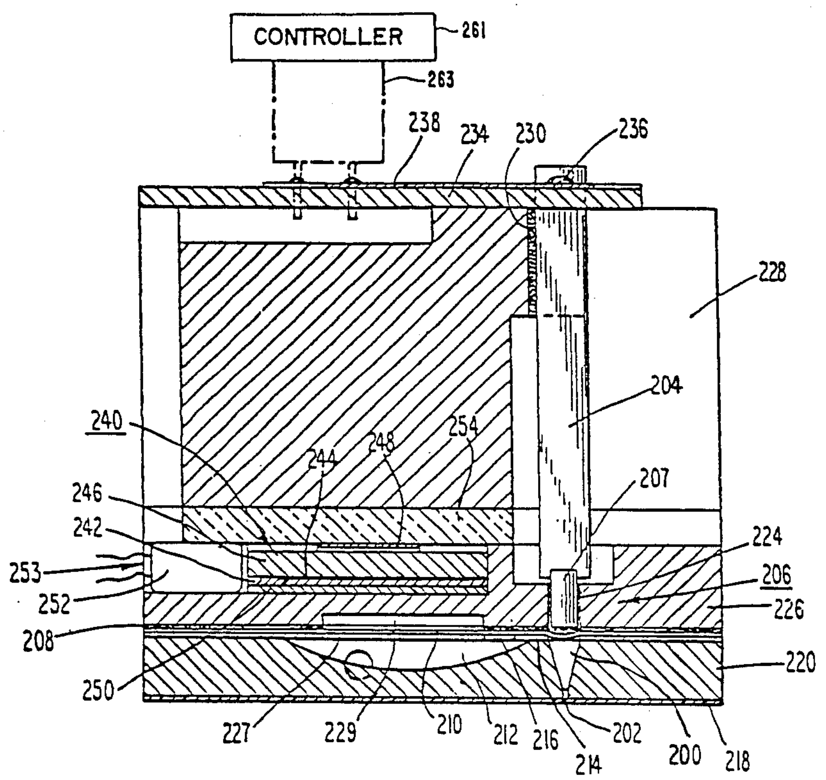
FIG. 1 is a sectional view of an ink jet apparatus assigned to the assignee of the present invention.
Figure 2:
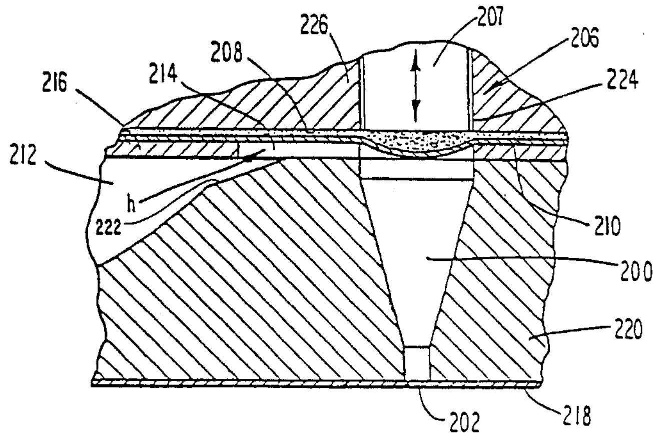
FIG. 2 is an enlarged view of a portion of the section shown in FIG. 1.
Figure 3:
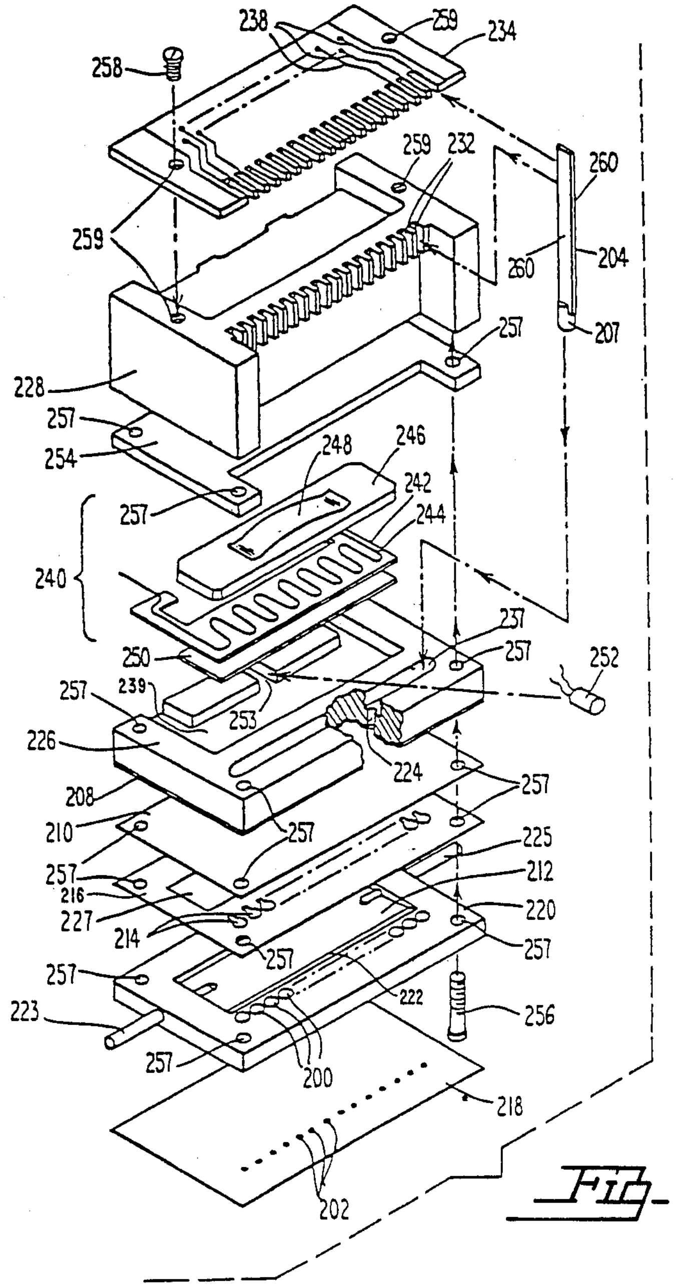
FIG. 3 is an exploded perspective or pictorial view of the ink jet apparatus including the embodiments shown in FIGS. 1 and 2.

With reference to FIGS. 1 through 3, the illustrative ink jet apparatus includes a chamber 200 having an orifice 202 for ejecting droplets of ink in response to the state of energization of a transducer 204 for each jet in an array of such jets (see FIG. 3). The transducer 204 expands and contracts (in directions indicated by the arrows in FIG. 2) along its axis of elongation, and the movement is coupled to the chamber 200 by coupling means 206 which includes a foot 207, a visco-elastic material 208 juxtaposed to the foot 207, and a diaphragm 210 which is preloaded to the position shown in FIGS. 1 and 2.

Ink flows into the chamber 200 from an unpressurized reservoir 212 through restricted inlet means provided by a restricted opening 214. The inlet 214 comprises an opening in a restrictor plate 216 (see FIG. 3). As shown in FIG. 2, the reservoir 212 which is formed in a chamber plate 220 includes a tapered edge 222 leading into the inlet 214. As shown in FIG. 3, the reservoir 212 is supplied with a feed tube 223 and a vent tube 225. The reservoir 212 is compliant by virtue of the diaphragm 210, which is in communication with the ink through a large opening 227 in the restrictor plate 216 which is juxtaposed to an area of relief 229 in the plate 226.

One extremity of each one of the transducers 204 is guided by the cooperation of a foot 207 with a hole 224 in a plate 226. As shown, the feet 207 are slideably retained within the holes 224. The other extremities of each one of the transducers 204 are compliantly mounted in a block 228 by means of a compliant or elastic material 230 such as silicon rubber. The compliant material 230 is located in slots 232 (see FIG. 3) so as to provide support for the other extremities of the transducers 204. Electrical contact with the transducers 204 is also made in a compliant manner by means of a compliant printed circuit 234, which is electrically coupled by suitable means such as solder 236 to an electrode 260 of the transducers 204. Conductive patterns 238 are provided on the printed circuit 234.

The plate 226 (see FIGS. 1 and 3) includes holes 224 at the base of a slot 237 which receive the feet 207 of the transducers 204, as previously mentioned. The plate 226 also includes a receptacle 239 for a heater sandwich 240, the latter including a heater element 242 with coils 244, a hold down plate 246, a spring 248 associated with the plate 246, and a support plate 250 located immediately beneath the heater 240. The slot 253 is for receiving a thermistor 252, the latter being used to provide monitoring of the temperature of the heater element 242. The entire heater 240 is maintained within the receptacle in the plate 226 by a cover plate 254.

As shown in FIG. 3, the variously described components of the ink jet apparatus are held together by means of screws 256 which extend upwardly through openings 257, and screws 258 which extend downwardly through openings 259, the latter to hold a printed circuit board 234 in place on the plate 228. The dashed lines in FIG. 1 depict connections 263 to the printed circuits 238 on the printed circuit board 234. The connections 263 connect a controller 261 to the ink jet apparatus, for controlling the operation of the latter.

Figure 4:
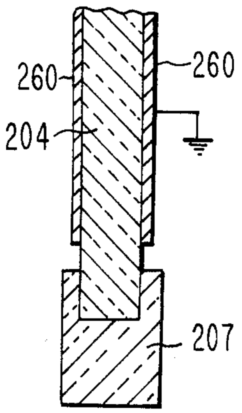
FIG. 4 is a partial sectional/schematic diagram or view of the transducer shown in FIGS. 1 and 3, with the transducer in the de-energized state.
Figure 5:
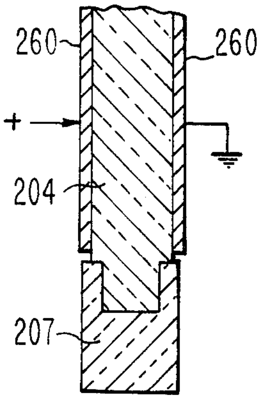
FIG. 5 is a partial sectional/schematic diagram or view of the transducer of FIG. 4 in the energized state.

The controller 261 is programmed to at an appropriate time, via its connection to the printed circuits 238, apply a voltage to a selected one or ones of the electrodes 260 of the transducers 204. The applied voltage causes an electric field to be produced transverse to the axis of elongation of the selected transducers 204, causing the transducers 204 to contract along their elongated axis. When a particular transducer 204 so contracts upon energization (see FIG. 5), the portion of the diaphram 210 located below the foot 207 of the transducer 204 moves in the direction of the contracting transducer 204, thereby effectively expanding the volume of the associated chamber 200. As the volume of the particular chamber 200 is so expanded, a negative pressure is initially created within the chamber, causing ink therein to tend to move away from the associated orifice 202, while simultaneously permitting ink from the resevoir 212 to flow through the associated restricted opening or inlet 214 into the chamber 200. Given sufficient time, the newly supplied ink completely fills the expanded chamber and orifice, providing a "fill before fire" cycle. Shortly thereafter, the controller 261 is programmed to remove the voltage or drive signal from the particular one or ones of the selected transducers 204, causing the transducer 204 or transducers 204 to return to their deenergized states as shown in FIG. 4. Specifically, the drive signals are terminated in a step like fashion, causing the transducers 204 to very rapidly expand along their elongated axis, whereby via the visco-elastic material 208 the feet 207 of the transducers 204 push against the area of the diaphram 210 beneath them, causing a rapid contraction or reduction of the volume of the associated chamber or chambers 200. In turn, this rapid reduction in the volume of the associated chambers 200, creates a pressure pulse or positive pressure disturbance within the chambers 200, causing an ink droplet to be ejected from the associated orifices 202. Note that as shown in FIG. 5, when a given transducer 204 is so energized, it both contracts or reduces its length and increases its thickness. However, the increase in thickness is of no consequence to the illustrated ink jet apparatus, in that the changes in length of the transducer control the operation of the individual ink jets of the array. Also note, that with present technology, by energizing the transducers for contraction along their elongated axis, accelerated aging of the transducers 204 is avoided, and in extreme cases, depolarization is also avoided.

Figure 6:
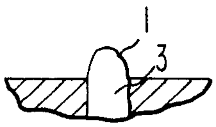
FIGS. 6 through 9 show the various stages of the development and ejection of an ink droplet from an orifice during ideal low velocity operation of an ink jet apparatus.
Figure 7:
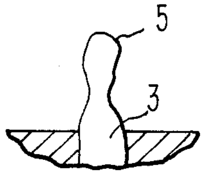
Figure 8:
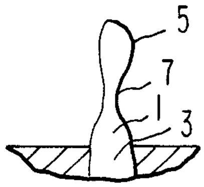
Figure 9:
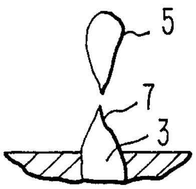

For the purposes of illustration, assume that low velocity operation of an ink jet apparatus is obtained when ink droplets are ejected having a velocity below about 3.0 meters per second, and that high velocity operation is obtained in a velocity range between 3.0 meters per second to in excess of 50.0 meters per second. FIGS. 6 through 9 show various stages in the production of an ink droplet during low velocity operation of an ink jet apparatus under substantially ideal conditions. In FIG. 6, shortly after the application of the positive pressure pulse, ink or the ink meniscus 1 begins to emerge from the orifice 3 of the ink jet. Shortly thereafter, a discernable ink droplet 5 begins to form, as shown in FIG. 7. Still later, the formation of the ink droplet 5 is almost complete, and it is attached via a ligament 7 to ink 1 protruding from the orifice 3. Finally, as shown in FIG. 9, the ink droplet 5 moves further away from the orifice 3 and breaks away from the ligament 7, completing the ejection of the ink droplet 5 from the orifice 3.

Figure 10:
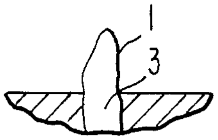
FIG. 10 shows the initial formation of a high velocity ink droplet or filament at an orifice.
Figure 11:
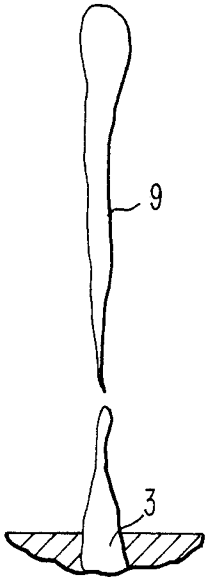
FIG. 11 shows a typical ink droplet or filament produced by prior methods of operation of an ink jet apparatus.
Figure 12:
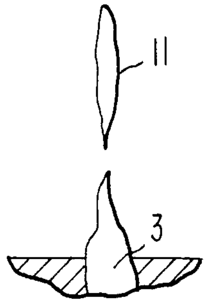
FIGS. 12 and 13 show typical ink droplets or filaments capable of being produced via the present method of operation of an ink jet for producing high velocity droplets or filaments.
Figure 13:
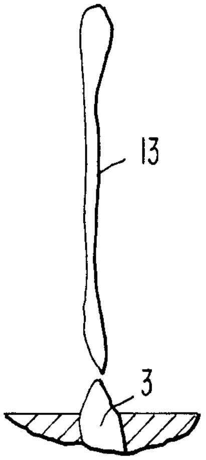

High velocity operation of an ink jet apparatus produces ink droplets that are not spherically shaped as for low velocity operation. Higher intensity positive pressure pulses than used in low velocity operation are applied to the chambers of ink jets for obtaining high velocity droplets, thereby causing within the same initial time period ink 1 to be pushed further away from an orifice 3 (see FIG. 10) than in low velocity operation (see FIG. 6). Also, at the time of the ejected ink breaking away from the ligament associated with the orifice 3, the ejected ink will take on the shape of long filaments in high velocity operation, such as shown in FIGS. 11 through 13, for example. In FIG. 11, the high velocity filament 9 may typically be formed when its time of break-away from the orifice is long, relative to the time of break-off for the filaments 11 and 13, of FIGS. 12 and 13, respectively, as will be described in greater detail. As previously mentioned, many problems occur in the prior art in operating ink jet devices at high velocities. One problem is that the non-spherical or filament like droplets produced in high velocity operation tend to break up into spurious "satellite" droplets having different trajectories, which strike the paper or recording media in areas away from the desired target area, causing unwanted marks.

The method of operation of an ink jet array discovered by the present inventor provides for controlling the time of "break-off" of the ink filament formed during high velocity operation, in a manner for insuring that the spurious "satellites" or ligament fragments formed during the high speed or high velocity flight of the ink all travel in the same trajectory as the "head" droplet or lead portion of the ejected ink. In this manner, all of the ejected ink strikes the recording media at the same point or on the desired target area, eliminating the unwanted marks. Also, via this method, satellite free operation can be obtained at higher velocities, as will be described.

In many applications of ink jet printers operating at a moderate print rate (print head speeds of less than 30 inches/sec), the above described high velocity mode of operation can be used to good advantage to improve print quality. For applications requiring higher printing rates, however, the elongated fractured ligament will result in an undesirable spreading of the ink on the paper in the direction of motion of the head, i.e. an elongated mark instead of a circular dot will result.

Figure 22:
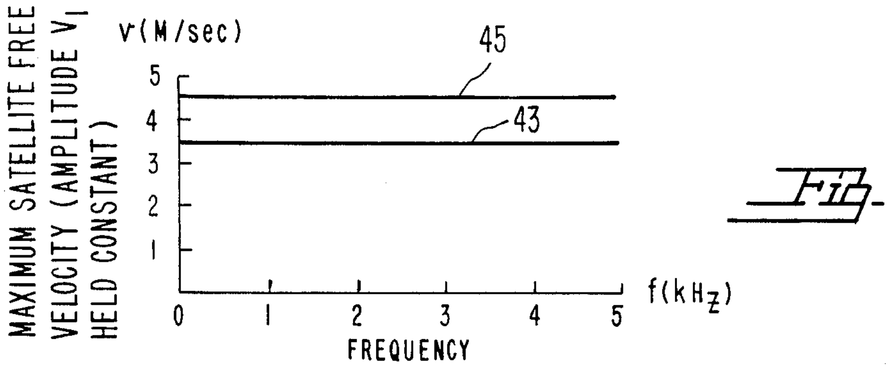
FIGS. 21 and 22 show curves illustrating the actual operation of the ink jet apparatus of FIGS. 1 through 5 with and without the use of the method of the present invention for high and low velocity operation, respectively. Note.

For these applications, the low velocity "satellite free" mode of operation is mandatory. In this mode, the auxiliary pulse can still be used to advantage to increase the maximum satellite free velocity and therefore the print quality. The mode of action of the auxiliary pulse is similar to the high velocity mode in that it serves to induce early "break-off" of the ink filament. As the drive voltage is increased, the ink ligament 7 shown in FIG. 8 increases in length and eventually, after break-off, becomes a separate satellite drop detached from the main drop 5 shown in FIG. 9. For high velocity printing the separation between the satellite and main drop would result in an extended mark on the paper or in extreme cases, two separate dots. The "no satellite" condition imposes a limitation on the drop velocity that can be used for high speed printing. The threshold velocity for producing this unwanted satellite can be increased by using the auxiliary pulse to initiate early break-off, thereby reducing the volume of ink in the tail. When the ink volume in the tail is reduced below some critical amount, the ink drop will "collapse" into a single spherical drop under the action of surface tension forces. FIG. 22 shows curves of maximum satellite free velocity versus frequency at constant voltage for a typical ink jet apparatus. Up to 5 KHz, curve 43 shows that a satellite free velocity of 3.5 M/sec. maximum is obtainable when using only a main pulse, whereas curve 45 shows that the satellite free velocity is extended to 4.5 M/sec. when an auxiliary pulse is used.

In broad terms, the present inventor discovered a wave-shaping technique to introduce an auxiliary disturbance into the compression chamber after the "firing" of the jet but during the ink droplet formation before "break-off". The auxiliary or secondary disturbance so introduced interferes with ligament formation in a manner for causing earlier "break-off" to occur than would otherwise occur, thereby producing shorter ligaments or filaments of ejected ink, and hence providing smaller volumes of ejected ink. In this example, the initial "firing" of the jet occurs when a main pulse is applied to a selected transducer 204, which contracts for a "fill cycle", and then expands upon termination of the pulse, for producing a sufficiently high positive pressure disturbance within the chamber of the associated ink jet for initiating ejection of a droplet of ink ("fire cycle"). Shortly after the main pulse is so applied and terminated, the present inventor discovered that if he applied an auxiliary pulse to the transducer that is of lower amplitude than the main pulse, and also typically below the amplitude threshold required for actually ejecting a second ink droplet, that he could produce a second pressure disturbance in the chamber for obtaining earlier "break-off" of the ink droplet in the process of being ejected from the ink jet because of the prior application of the main pulse. The present inventor further discovered that if the phase and amplitudes of the main and auxiliary pulses are properly chosen, that the effect is to eliminate the high velocity instabilities associated with the ligament break-off process, such as puddle formation and uncontrolled satellite droplets, and to obtain smaller dot sizes upon the recording paper. Also, he discovered that via the same method, he could control dot size and hence "print boldness" by controlling the previously mentioned amplitude ratio and phasing between the main and the auxiliary pulses. Note that in this example, the ink droplets "break off" after termination of the auxiliary pulses. By properly shaping the main and auxiliary pulses, he also obtained satellite free operation at higher velocities, than could otherwise be obtained.

Figure 23:
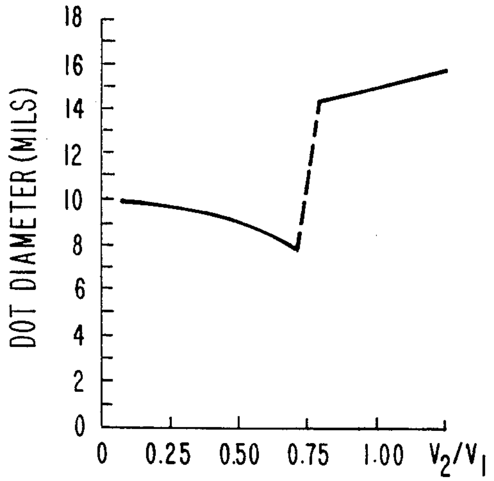
FIG. 23 shows a typical curve relating dot diameter (on particular print medium) versus the amplitude ratio of the pulses of FIG. 20.

The present inventor experimented with combinations of different waveshapes for the main and auxiliary pulses used to operate the previously illustrated ink jet apparatus in the high velocity mode of operation. A number of these different combinations, that produced improved performance, are shown in FIGS. 14 through 20, for example. With reference to these figures, main pulses are 15, 19, 23, 27, 31, 35, and 39; and auxiliary pulses are 17, 21, 25, 29, 33, 37, and 41. He discovered that by controlling the ratio $+V_1/+V_2$, the duration or pulse time $T_1$ for the main pulses, the period of time $T_2$ between the termination of the main pulses and the auxiliary pulses does not apply to FIGS. 16, 18, 19, and the pulse width or duration $T_3$ of the auxiliary pulses, that high velocity performance of an ink jet array is substantially improved. Also, dot size control or print boldness, he discovered, could be controlled within a range by varying $T_2$ while holding the ratio $V_1/V_2$ constant, whereby dot size was found to increase with increases in the magnitude of $T_2$. In addition, dot size or print boldness can be controlled by changing the amplitudes of $V_1$ and $V_2$ while maintaining or changing their ratio (see FIG. 23) relative to the optimum value for substantially eliminating blobbing (maximum stability). Note that the dashed portion of the curve of FIG. 23 is an "ill" defined transition region for "second drop" production. By simultaneously controlling $T_2$, and the amplitudes $+V_1$ and $+V_2$ of the main and auxiliary pulses respectively, dot size or boldness of print can also be controlled. Note that the values selected for any of these parameters for providing optimal performance of a particular ink jet array or device will vary from one ink jet device to another. Accordingly, any values specifically given for the waveforms shown are most directly related to the illustrative ink jet array used by the present inventor in his experiments.

Figure 14:
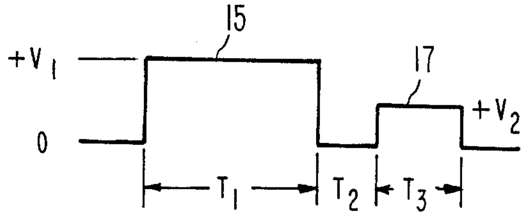
Figure 15:
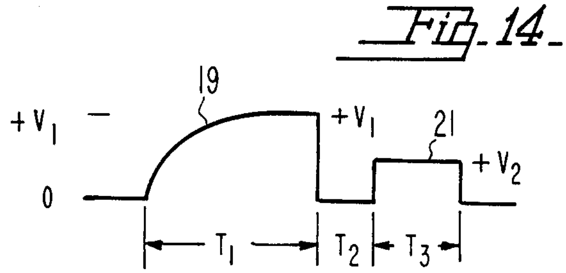

In FIG. 14, rectangular main and auxiliary pulses 15, 17, respectively are shown. For the waveshape of FIG. 15, the main pulse 19 has an exponentially rising waveshape along its leading edge, and a step like trailing edge; and the auxiliary pulse 21 is rectangular.

Figure 16:
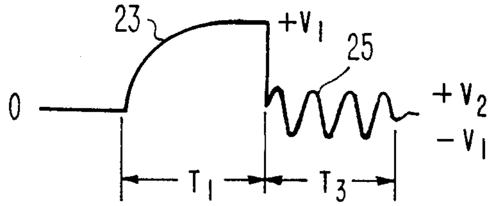
Figure 17:
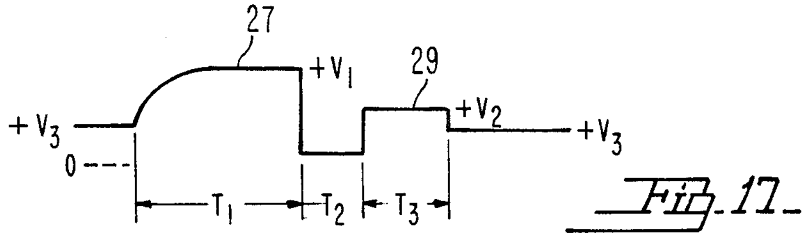
FIGS. 17 through 20 show the waveshapes and relationship between various main transducer drive pulses and auxiliary transducer drive pulses, respectively, of various embodiments of the present invention, with FIG. 21 being a preferred embodiment of the invention.

The waveshape of FIG. 16 includes a main pulse 23 immediately followed by a sinusoidal burst or auxiliary pulse stream 25. In FIG. 17, the waveshape includes a main pulse 27 including a portion having a DC offset of $+V_3$ volts, followed thereafter for a period of time $T_1$ by an exponential portion, at the end of which period $T_1$ the pulse 27 steps back to 0 volts. The associated auxiliary pulse 29 is rectangular in shape.

Figure 18:
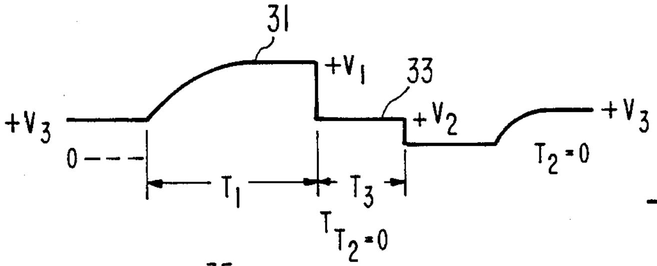

In FIG. 18, the main pulse 31 includes a DC offset portion of $+V_3$ volts, followed by an exponentially rising portion up to a peak amplitude $+V_1$. The time period $T_2$ is $=0$, and the auxiliary pulse 33 is rectangular in shape with a pulse width $T_3$.

Figure 19:
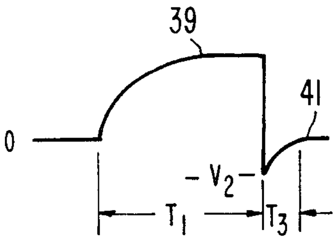

For the waveshape of FIG. 19, the main pulse 39 includes an exponentially rising leading edge up to a peak amplitude of $+V_1$ volts, and a step-like trailing edge. The auxiliary pulse 41 has a peak amplitude of $-V_2$ volts, a step like leading edge, and an exponentially decaying trailing edge. In this example, the time between the pulses, $T_2$, is 0.

Figure 20:
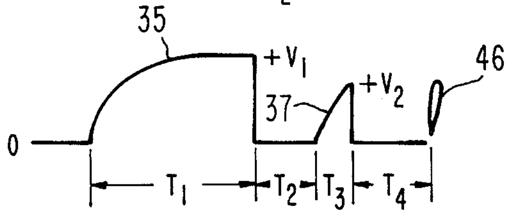

In FIG. 20 both the main pulse 35 and auxiliary pulse 37 have exponentially rising leading edges and step like trailing edges, and amplitudes of $+V_1$ and $+V_2$ volts, respectively. Note that the controller circuitry required for producing these pulses can be simplified by clipping a portion of a main pulse 35 for obtaining the auxiliary pulse 37.

In general, FIG. 20 represents the most preferred waveshape discovered for operating the ink jet apparatus (substantially as illustrated herein) for producing stable high velocity filament like ink droplets. For this preferred waveform, typically $T_2$ is 0 (see FIG. 20), $T_1$ is equal to 75 microseconds, and $T_3$ is equal to 7 microseconds (for a particular ink jet apparatus operated by the present inventor).

It is also possible to optimize the waveshapes of pulses 35,37 to produce a dot on the print medium of a required size, for a particular ink jet apparatus. The optimum values of the parameters $T_1$, $T_2$, $T_3$ and $V_1/V_2$ for this application depend on the dot size required. This may involve a compromise on the optimum stability point (optimum value of $V_1/V_2$ and $T_2$), but the stability is reasonably tolerant to variations in the parameters and the dot size range can be selected by varying the main drive voltage $V_1$, for example.

For example, operating with the parameters adjusted for maximum stability (values given above), the auxiliary pulse results in a dot diameter reduction of about 20%. To increase dot size by about 50% the preferred values of the parameters are typically: $T_1=75$ microseconds, $V_1/V_2=3/2$, $T_2=5$ microseconds, $T_3=8$ microseconds, for the ink jet apparatus tested.

Control within a range of the volume of ink ejected for any given firing of an ink jet was obtained via adjustment of the values of the amplitudes of the main and auxiliary pulses, $V_1$ and $V_2$, respectively, while maintaining the preferred ratio therebetween. The period of time $T_4$ between termination of the auxiliary pulse 45 and "break off" of a droplet 46 is typically 60 microseconds, for the particular device tested.

Figure 21:
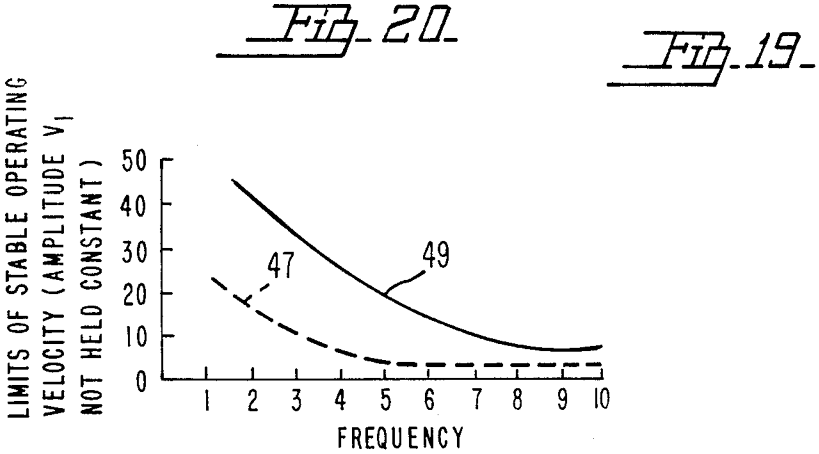

Through experimentation, the present inventor found that by increasing either the velocity of the ejected ink droplets or the drop repetition rate (frequency) a point was reached where instabilities in operation occurred, such as ink puddles forming around the jet orifice, as previously mentioned. In FIG. 21, curves are shown of maximum velocity versus frequency for maintaining stable operation of the ink jet apparatus. The dashed curve or broken line curve 47 represents the threshold level for instability during operation of an ink jet apparatus using only a main drive pulse (the unstable region is above curve 47). Curve 49 shows operation of an ink jet apparatus via drive waveforms including both a main pulse and an auxiliary pulse, similar to the waveforms of FIGS. 14 through 20. As shown, through the use of the auxiliary pulse, the velocity versus the frequency limits for stable operation were significantly increased. Note that in either case, for a given frequency of operation of the ink jet apparatus, there is a limit on the velocity, above which instability results. Also, in practice, the curve of instability threshold for a multichannel ink jet apparatus may vary considerably from channel to channel, producing a range of "high velocity limits" rather than a single limit number. These curves may also vary as between one similar ink jet apparatus compared to another, depending upon production tolerances, and other variables. As shown by the curves of FIG. 21, for the type of ink jet apparatus used by the present inventor, operating at a droplet emission frequency of 5 kilohertz, the velocity of the emitted droplets may typically range between 5 meters per second to 20 meters per second, depending upon the use of an auxiliary pulse, as previously described. Of course, the viscosity and formulation of the ink used will affect the slope of curves 47 and 49.

From the curves shown in FIG. 21, it is evident that in applications requiring high printing speeds from an ink jet apparatus, low velocity operation or production of low velocity ink droplets may be required for maintaining circular dots. Note that as previously mentioned, aiming can be a problem with low velocity operation. However, as shown in copending application Ser. No. 384,134, filed on June 1, 1982, for "A Method for Improving Aiming in Low Velocity Operation of an Ink Jet Apparatus", the proper use of an auxiliary pulse provides improved aiming accuracy in the low velocity region.

As previously mentioned, the most preferred waveshape discovered by the present inventor is shown in FIG. 20. He discovered in using this waveshape that when the ratio of $V_1/V_2$ is made lower than 3/2, although high velocity performance of the ink jet apparatus was significantly improved in comparison to not using an auxiliary pulse, that the second "firing edge" of the auxiliary pulse may result in the ejection of more ink, for the ink jet device tested. In certain applications this phenomena may be used to advantage in increasing the volume of ink ejected for controlling "dot size". Contrarywise, where the auxiliary pulse is designed for obtaining the earliest possible break-off and shortening of the ejected ink ligament, a decreased volume of ink is ejected, resulting in a substantially decreased "dot size". Obviously, this observed effect offers a means for dynamically controlling the appropriate waveform parameters for controlling dot size. Also, in lieu of dynamic control, a manual control can be provided for controlling waveform parameters for providing a boldness of print adjustment. These prior comments apply not only for the waveform of FIG. 20, but also for the waveforms of FIGS. 14 through 19, and other waveshapes or waveforms that may be thought of by those skilled in the art.

In summary, print boldness can be substantially increased by decreasing the ratio $V_1/V_2$ to a region where the auxiliary pulse actually provides a second "firing edge" via its trailing edge (in this example), which causes the trailing ligament to also break away from the orifice and travel in the same trajectory as the initially ejected mass of ink, instead of the former falling back into the orifice upon break-off of the latter. Also, as previously mentioned, the same effect can be achieved without increasing the amplitude of the auxiliary pulse, for example, by causing the auxiliary pulse to occur sometime after the termination of the main pulse. Also, by properly adjusting the waveshape parameters of ($V_1$, $V_2$, $T_1$, $T_2$, $T_3$) the main and auxiliary pulses, dot size uniformity can be maintained while increasing frequency. This "proper" adjustment coincides with the values for optimizing stability.

The controller 261 can be provided via hard wired logic, or by a microprocessor programmed for providing the necessary control functions, or by some combination of the two, for example. Note that a Model 175 arbitrary waveform generator, manufactured by Wavetek of San Diego, Calif., U.S.A., was used to obtain the waveshapes shown in FIGS. 14 through 20 by the present inventor in conducting experiments for developing the present method of operation of an ink jet apparatus. In a practical system, a controller 261 would typically be designed for providing the necessary waveshapes and functions, as previously mentioned, for each particular application.

Although particular embodiments of the present inventive method for operating an ink jet apparatus have been shown and described, other embodiments may occur to those of ordinary skill in the art which fall within the true spirit and scope of the appended claims.

What is claimed is:

1. A method for driving an ink jet head with a composite waveform including independent successive first and second electrical pulses for ejecting an ink droplet of controlled volume to print at droplet velocities ranging from 3.5 meters per second to in excess of 50.0 meters per second, said method further providing stabilized operation of said ink jet head for both producing high-velocity ink droplets substantially free of "satellite droplets", and substantially eliminating the formation of "puddles of ink" about an associated orifice of said ink jet head, said method comprising:
   (1) constructing said first electrical pulse to have an amplitude greater than said second electrical pulse, whereby termination of said first electrical pulse causes rapid volume reduction of an associated ink chamber of said ink jet head, for initiating the ejection of an ink droplet from said associated orifice;
   (2) constructing said first electrical pulse to have a pulse width substantially greater than that of said second electrical pulse, whereby application of said second electrical pulse causes rapid volume expansion of said associated ink chamber for causing earlier break off of said ink droplet from said associated orifice relative to only using first electrical pulse; and
   (3) controlling the volume of said ink droplet(s) via adjustment of either one or a combination of the ratios of the amplitudes and pulse widths of said first to said second pulses, and the time period between the termination of said first pulse and initiation of said second pulse.

2. The method of claim 1, wherein said first step further includes shaping said first electrical pulse to have an exponential leading edge, and a step-like trailing edge.

3. The method of claim 1, wherein said second step further includes shaping said second electrical pulse as a sine wave burst.

4. The method of claim 1, wherein said first step further includes adjusting the amplitude of said first pulse for obtaining high velocity ink droplets having velocities ranging from 3.5 meters per second to in excess of 50.0 meters per second.

5. The method of claim 1, wherein said second step further includes shaping said second electrical pulse to have an exponentially rising leading edge and a step-like trailing edge.

6. The method of claim 1, further including the step of adjusting the amplitudes of said first and second pulses to maintain a ratio for optimizing the stability of operation of said ink jet device.

* * * * *